W. HART.
WHEEL MOUNT FOR VEHICLES.
APPLICATION FILED MAY 5, 1911.

1,072,716.

Patented Sept. 9, 1913.

Witnesses:
Samuel W. Balch
Frank C. Cole

Inventor,
William Hart
by Thomas Ewing Jr.
Attorney

UNITED STATES PATENT OFFICE.

WILLIAM HART, OF TARRYTOWN, NEW YORK.

WHEEL-MOUNT FOR VEHICLES.

1,072,716.  Specification of Letters Patent.  Patented Sept. 9, 1913.

Application filed May 5, 1911. Serial No. 625,209.

*To all whom it may concern:*

Be it known that I, WILLIAM HART, a citizen of the United States of America, and a resident of the village of Tarrytown, county of Westchester, and State of New York, have invented certain new and useful Improvements in Wheel-Mounts for Vehicles, of which the following is a specification.

My invention is applicable to wheels for vehicles of all types, whether self propelled or drawn by extraneous power, and whether traveling on fixed track or on roads or highways.

The object of my invention is to afford a resilient support for a vehicle of such a type and so placed that the jar and jolting occasioned by the wheels encountering and traveling over obstacles are not transmitted to the axles of the vehicle, whereby the necessity of pneumatic tires is minimized or entirely done away with.

The invention consists broadly in introducing resilient supporting means between the axles and the wheels.

It further consists in placing said means directly in line with the blow of the obstacle; and in providing for a slight sidewise movement of the wheels on the axles to permit them to slide down the side of an obstacle or throw it from the path instead of traveling over it.

The invention consists further in the construction, combination and arrangement of parts, as hereinafter more fully set forth and claimed.

Figure 1:
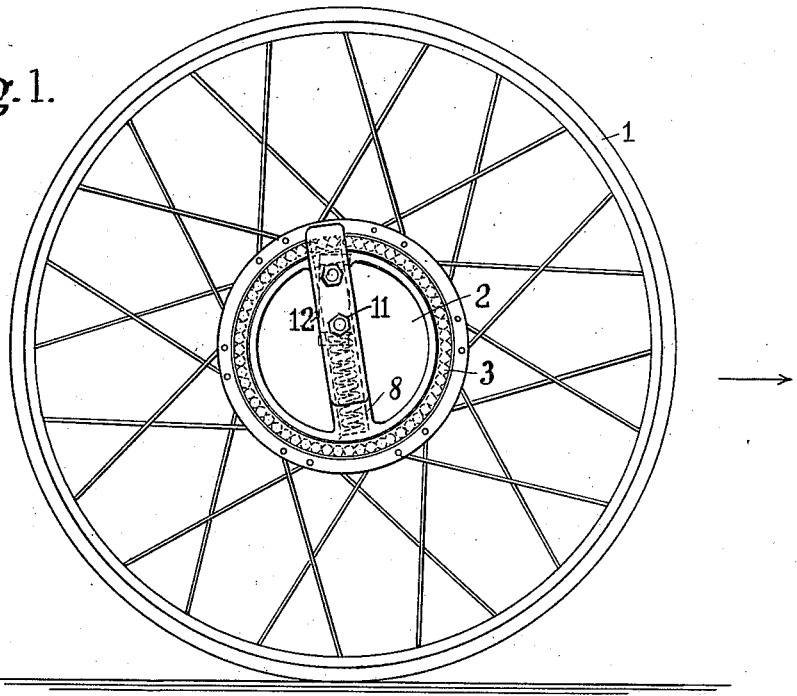
Figure 2:
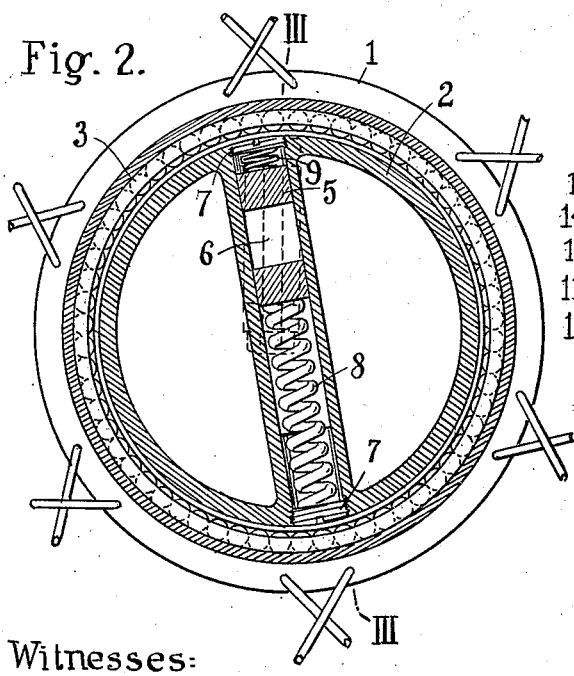
Figure 3:
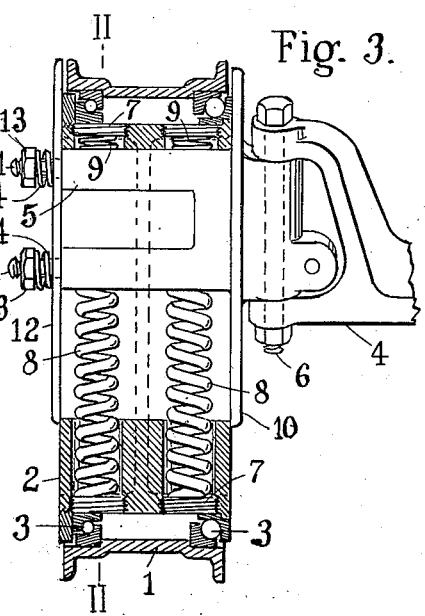

In the accompanying sheet of drawings, Figure 1 is a side elevation of a vehicle wheel showing my invention applied thereto; Fig. 2 is a vertical section on line II—II of Fig. 3 and Fig. 3 is a section in line III—III of Fig. 2.

The vehicle wheel 1, which is shown with a solid tire has a hub with a large bore to permit a large axle-skein 2, to be journaled therein. Ball races and balls 3 3 are interposed between the wheel and the axle-skein to reduce the friction to a minimum. The axle-skein is slotted, the slot lying along the diameter thereof. The axle-skein slidably supports an axle 4 which is formed at the end of a tongue 5 of the same width but of less depth than the slot to permit the desired sliding movement. The tongue may be cut out in the center or forked for lightness as shown and is preferably set at an angle to the vertical and about in line with the upward and rearward movement along which the wheel naturally recoils when running onto an obstacle. The tongue portions at either end of the axle and the middle portion of the axle are hinged together by a vertical pin 6 to form the usual steering knuckle when the device is used on the forward axle of an automobile. The axle-skein has two parallel holes at right angles to the axis at either end of the slot which are closed at their outer ends by plugs 7 7 to form spring pockets. The lower pockets contain springs 8 8 which serve as resilient means for the support of the tongue of the axle in the axle-skein. The upper pockets contain smaller springs 9 9 which serve as a recoil cushion. The tongue of the axle is of the same length as the width of the axle-skein at the slot, and is formed with a plate 10 which serves as a shoulder to the tongue and covers the portions of the slot which are not occupied by the tongue on the vehicle side of the wheel. Studs 11 11 are formed on the end of the tongue and pass through a plate 12 which covers the slot on the outward side of the wheel. The studs carry springs 14 14 which are held on by nuts 13 13 and press against the plate to afford resilient means for maintaining the axle in the slot.

In operation when the wheel strikes an obstacle squarely the supporting springs 8 8 are compressed and take up the jolt or jar, and the springs 9 9 cushion the recoil. The angle of the slot in the axle-skein depends on the size of the obstacle which the wheels are likely to encounter, and should be such that the slot is about in line with the upward and rearward movement along which the wheel naturally recoils. The whole force of the blow is thus met by the spring. The springs 14 permit the wheel to slide a short distance sidewise on the axle and thus to slide down the side of an obstacle which is not struck squarely or to throw it from the path, as will readily be understood.

While I have described my invention in detail and as applied to the forward axle, it is to be understood that I do not intend thereby to confine it to such details or use, as many modifications will occur to those skilled in the art and its use on rear axles is obvious.

What I claim as new and desire to secure by Letters Patent of the United States, is—

1. The combination of a vehicle wheel, an axle-skein journaled therein, an axle slidably supported by the axle-skein, resilient means for said support, and resilient means for maintaining the axle in the axle-skein, substantially as described.

2. The combination of a vehicle wheel, an axle-skein journaled therein and provided with a slot at an angle to the vertical, a coil spring maintained in the slot, an axle slidably mounted in the slot supported by the spring, a spring-pressed plate attached to the axle maintaining the axle in the slot, and a coil spring between the top of the axle and the axle-skein, substantially as described.

Signed at Tarrytown, N. Y., this 2nd day of May, 1911.

WILLIAM HART.

Witnesses:
LILLIE HART,
FRANK V. MILLARD.

Copies of this patent may be obtained for five cents each, by addressing the "Commissioner of Patents, Washington, D. C."